Figures 1, 2, 3:
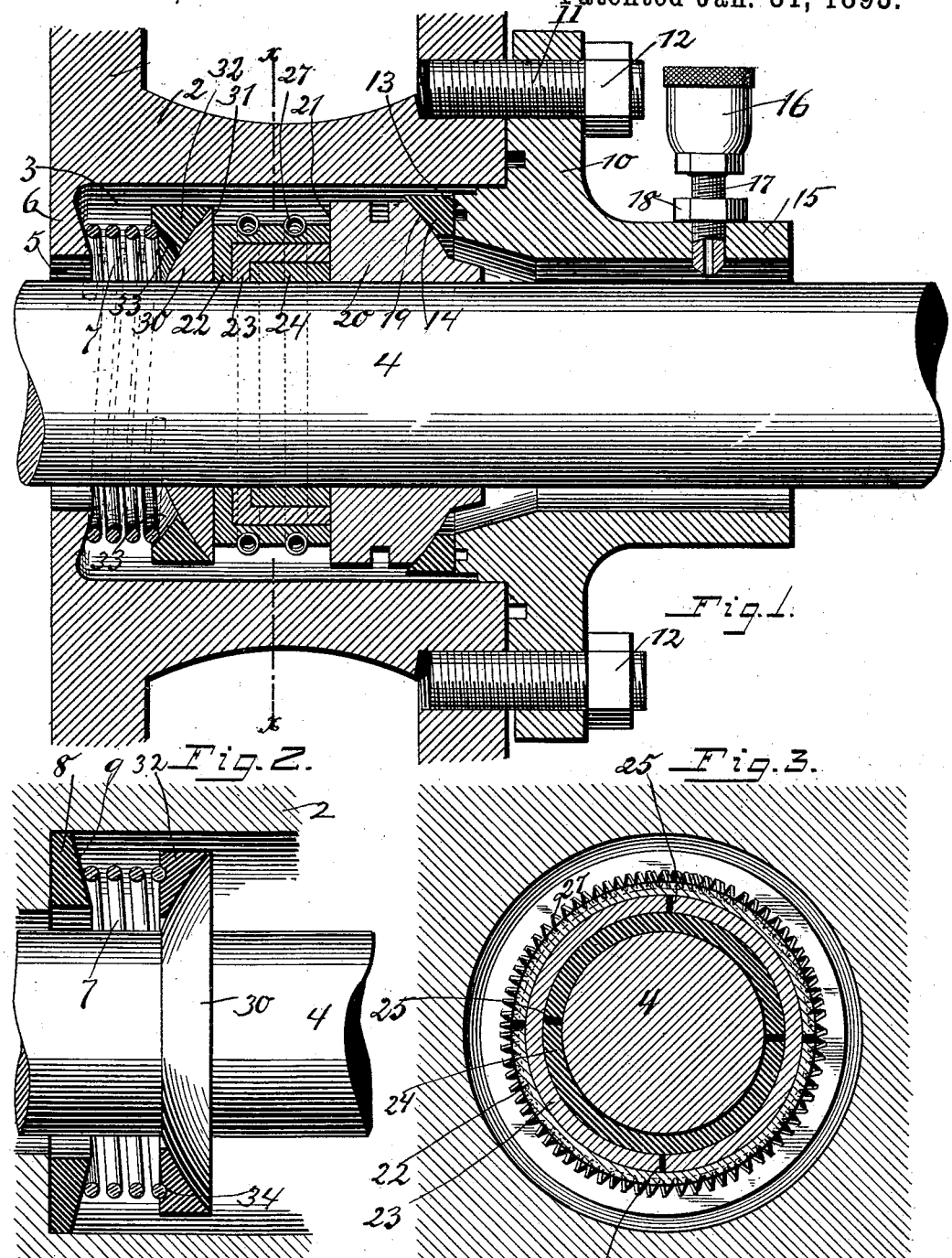

(No Model.) 3 Sheets—Sheet 1.

F. D. TOUCEY.
ROD PACKING.

No. 491,029. Patented Jan. 31, 1893.

Witnesses.
Inventor.
Ferris D. Toucey.

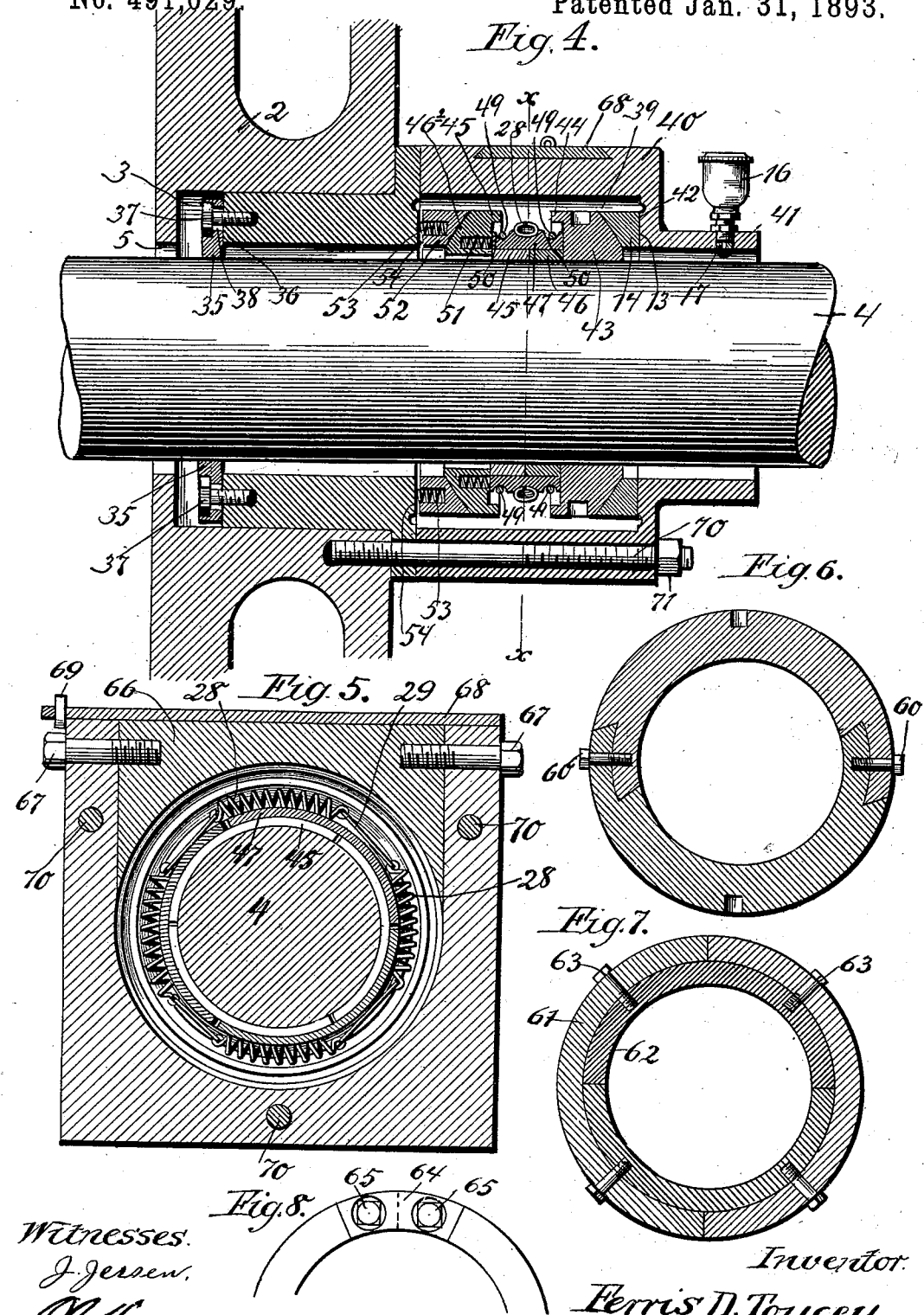

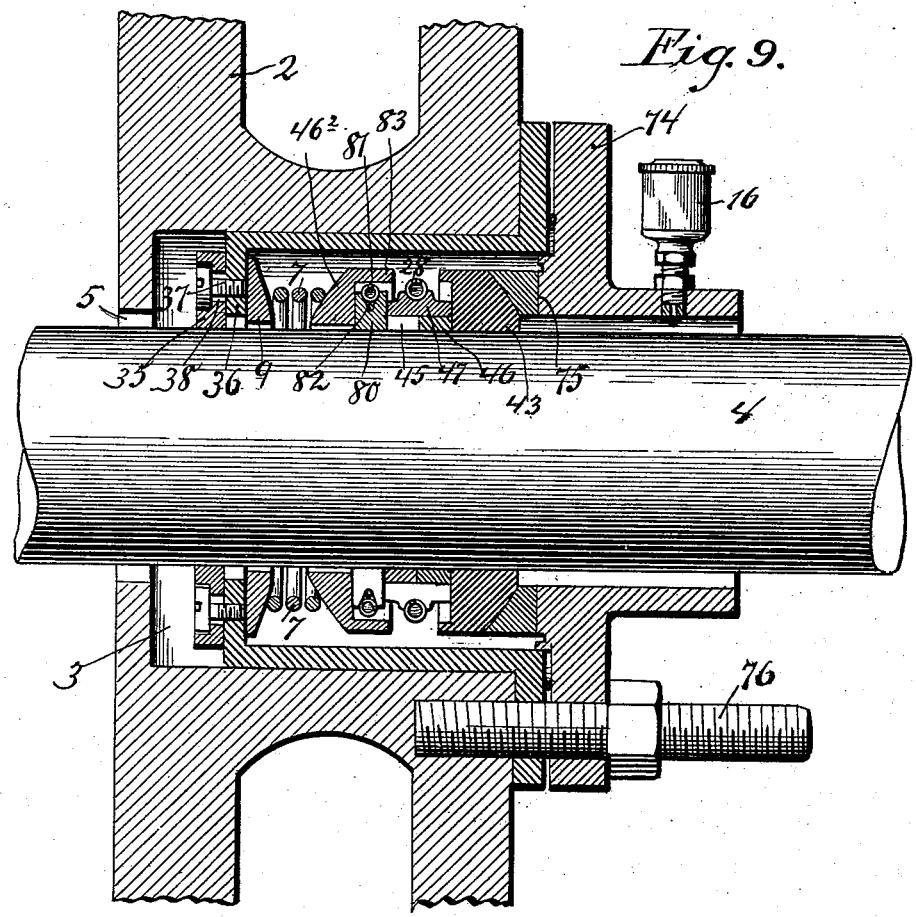
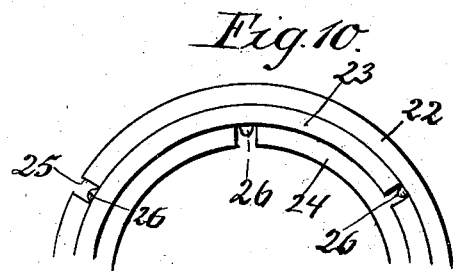

UNITED STATES PATENT OFFICE.

FERRIS D. TOUCEY, OF MINNEAPOLIS, MINNESOTA, ASSIGNOR OF THREE-FOURTHS TO FRANK DUNHAM, GEORGE McNEIR, AND FREDERICK C. JOHNSON, OF SAME PLACE.

ROD-PACKING.

SPECIFICATION forming part of Letters Patent No. 491,029, dated January 31, 1893.

Application filed July 21, 1891. Renewed December 27, 1892. Serial No. 456,391. (No model.)

*To all whom it may concern:*

Be it known that I, FERRIS D. TOUCEY, of Minneapolis, in the county of Hennepin and State of Minnesota, have invented certain Improvements in Rod-Packings, of which the following is a specification.

My invention relates to a metallic packing for rods and the object of the invention is to provide a packing composed entirely of metal and of a very simple, cheap and durable construction.

Further the object is to provide means whereby an equal tension may be exerted on all points of the packing rings. And further to provide packing which may be readily removed and replaced by the ordinary rope packing and also to provide means whereby the valve rod may be locked without the displacement or disarrangement of the packing.

My invention consists in a metallic packing made up of two or more split packing rings adapted to encircle the rod and retained between two rings each provided with a ball surface and socket rings engaging the same, one of said rings having a plane side adapted to make a steam tight joint with the end of the gland and the other socket ring being pressed upon its ball ring by a spring or springs whereby the strain or tension upon all of said springs is equalized.

My invention consists further in spiral springs adapted to be secured on the peripheries of the outer packing rings to hold the same in place; further in a particular form of case made by said ball rings for said packing rings; further a particular arrangement of construction of the packing rings; further in means for pressing the same against their respective ground joint surfaces; further in a double gland construction of the packing; further a particular construction of the rings whereby they may be secured upon or removed from the rod; further a sleeve extending out from the gland and covering the portion of the rod where the oil is applied whereby the blowing away of the oil is prevented while dropping on said rod; and further in a combined set-screw and oil-cup for use on said sleeve and whereby said valve rod may be locked all as hereinafter and particularly described.

My invention consists further in various details of construction and in combinations hereinafter described and particularly pointed out in the claims.

My invention will be more readily understood by reference to the accompanying drawings, in which:—

Figure 1 is a longitudinal section showing a valve rod packing embodying my invention, also the set-screw and oil-cup. Fig. 2 is a detail modification of the same. Fig. 3 is a transverse section on the line $x$—$x$ of Fig. 1. Fig. 4 is a longitudinal section showing a modified form of my invention. Fig. 5 is a cross section thereof on the line $y$—$y$ of Fig. 4. Figs. 6, 7, and 8 show two constructions of the ball rings whereby they are made separable from the valve rod. Fig. 9 is a longitudinal section showing another and modified form of my invention. Fig. 10 is a detail showing means for preventing a rotative movement of any one of the compressible packing rings with respect to another.

I will first describe the simplest form of my device: As shown in Figs. 1, 2 and 3 where 2 represents the cylinder-head provided with the stuffing box 3, the rod 4 is adapted to move back and forth through the opening 5 in the end of the head, this opening being smaller in diameter than the stuffing box, the flange or head 6 is formed. The large coiled spring 7 is placed in the back of the stuffing box and is adapted to press against the flange 6. To center the spring 7 with respect to the rod I preferably cone the inner surface of the flange 7 as shown either by giving it that shape upon the original construction of the cylinder or in old stuffing boxes inserting the ring 8 shown in Fig. 2 and having the coned surface 9 as shown against which the end of the coiled spring 7 is adapted to rest. The other end of the stuffing box is closed by the gland 10 secured in place by the stationary bolt 11 and the burr 12. The gland is extended into the stuffing box a short distance and is provided with the annular plane or ground surface 13 with which the socket ring 14 having the flat side shown, is adapted to engage. The gland is provided with the sleeve 15 having an interior diameter larger than that of the rod and extending out a considerable distance therefrom. The oil-cup 16 is arranged on this sleeve and the oil therefrom drops onto the rod within the sleeve. The advantages of this construction are that the sleeve strengthens the gland and that the air being confined and quiet within the sleeve the oil drops upon the rod while in the old construction the oil is often blown off from the end of the oil cup tube before striking upon the rod and hence leaving the rod practically dry. The stem or tube 17 of the oil-cup shown in Fig. 1 is longer than usual and threaded as shown to receive the locking nut 18 and to be screwed through the threaded hole 15 of the sleeve. The lower end of the oil cup tube is sharpened to allow the oil to drip therefrom more centrally. By loosening the nut 18 the oil-cup may be screwed down firmly so that the end of the stem engages the valve rod to lock the same against any longitudinal movement. This construction is a great advantage owing to the fact that the gland and the packing joint need not be disturbed in any way in order to lock the valve rod and hence the steam tight joints are always maintained. The necessity for locking the valve rod occurs frequently on locomotives where upon the breaking down of one side of the engine that side must be disconnected and the engine run into town and the shop by the other side alone.

The socket ring 14 is adapted to engage the ball surface 19 of the carrying ring 20 which is adapted to fit tightly upon the rod while at the same time being loose enough thereon to prevent the movement of the rod. The inner surface 21 of this carrying ring is ground to a perfect plane and is practically perpendicular to the rod. The sides or edges of the packing rings 22, 23, and 24 are adapted to engage and make steam tight joints with the rod 4 and one another. These rings as shown in Fig. 3 are split or cut one or more times at points 25. These cuts in the different rings are arranged so as to be closed by the adjoining rings and as shown in Fig. 10 a small drop of solder 26 is provided on the inside of the top ring or outside of the bottom ring and extends into the cut 25 to prevent any rotative movement of either ring with respect to the other whereby any possibility of the cuts of two rings coming to coincide so as to form a leak is avoided. Where the packing rings are cut more than once it is necessary to provide some means for holding them in place around the rod 4. For this purpose I provide one or more endless coiled springs 27 adapted to encircle the outer packing ring and to exert a compressing tension thereon. This spring is preferably confined in a groove provided in the packing ring as shown in Figs. 1, 4 and 9.

I ordinarily employ German silver coiled springs as the same retain their tension better when subjected to the heat of steam than springs of other metals. As the German silver is quite expensive I economize the use of the same by employing a number of short coiled wire spring sections 28 shown in Fig. 5 and connected around the packing-rings by the straight wire 29 as shown. Upon very large rods the wires 29 would be considerably longer than the spring sections. In this way an even tension is maintained upon the packing rings without the use of a continuous coiled spring such as that shown in Fig. 3.

The packing rings may be made and combined in a number of ways and are backed or followed by the ball surface rings 30 having the face 31 adapted to engage the packing rings. The ball surface of this ring which is similar to the ring 20 is adapted to receive the socket ring 32 against which the large coiled spring 7 presses. In the several views of the drawings I have shown this ring as provided in three different forms. In Fig. 1 the ring is provided with a ball socket 33 adapted to receive and center the spring 7. In Fig. 2 a simple groove 34 is provided to receive the forward coil of the spring 7. And further in Fig. 9 a convex ball surface is provided on the ring 32 and the spring 7 engaging the same will obviously be centered with respect to the rod 4, without regard to the position of the oscillating following ring with respect to the same.

The packing thus described is the same in all the views of the drawings though somewhat modified and it will be seen that the steam entering the stuffing box through the opening 5 around the rod will encounter steam tight joints at the points of contact between the packing-rings and the rod; the packing rings and the carrying ring 20; the carrying ring 20 and the socket ring; and between the plane surfaces of the socket ring 14 and the outer end of the stuffing box walls. It will be noticed that a free space is left around the rod the full length of the gland 10 and the sleeve thereof. This is to allow for vibration of the rods, also oscillation of valve rod, without having the rods come in contact with the gland. The rods should not touch the gland for two reasons, namely; first it would be liable to cut the rod; second, it would bend the rod. The inside diameter of each socket ring is considerably greater than that of the rod so that it is impossible for the same ever to strike thereon no matter how much the rod may move out of the axial line of the cylinder and stuffing box.

There are times when it is necessary to remove the metallic packing and replace the same by the ordinary flexible packing. In order that this may be done there must be a closed front for the stuffing box and hence it will be seen that the arrangement shown in Fig. 1 could not be so utilized. I overcome this objection by employing two glands, one of which is adapted to enter the stuffing box while the other is arranged on the outside of the same and normally holds the metallic packing in place. The inside gland has the washer 35 secured on its end 36. This washer fits snugly but loosely around the rod 4 and is secured to the end 26 by the bolts 37 passing through holes 38 of a larger diameter than the bolts so that the washer is adapted to follow the rod in its lateral movement. The heads of the bolts are counter-sunk as shown. In case the metallic packing should break both glands can be withdrawn as one gland and flexible packing then placed in the stuffing-box and both glands pushed back into the same and firmly against the packing and it will be seen that the packing will be prevented from blowing out by the washer 35 and the end 36 of the gland. This operation will cause but a few minutes' delay. The double gland I prefer to form in two ways. One as shown in Fig. 4, the other as shown in Fig. 9. In the first the inner gland is only bored out just enough to allow the rod freedom of movement and the metallic packing is secured on the outside of the cylinder head and inside of the stuffing box chamber 39 of the outer gland 40 having the sleeve 41 adapted to receive the oil-cup as shown. The inside of the forward end of the gland 40 is provided with the ground surface 42 with which the movable socket ring 14 is adapted to make a steam tight joint.

The carrying or guide ring 43 is practically the same as the ring 20 of Fig. 1 except that it is provided with the overhanging rib 44 which with a similar rib 45 on the following ring $46^2$ prevent the falling out of the packing rings arranged between them. These packing rings are shown in Fig. 4 and also in Fig. 9 and are somewhat differently arranged than those of Fig. 1. The rings are plain and of a substantially rectangular cross section, the inner rings 45 and 46 being covered by the wide outer ring 47 held firmly thereon by the coiled spring 48 passing transversely about the rings. This spring 48 is arranged in the groove shown. I prefer to further secure the packing rings by means of the wires 49 held in the grooves 50 and tied about the rings. It will be seen that the wide ring 47 cannot be in practice made and retained in exactly the same width as the two inner rings. I therefore employ the springs 51 arranged in the side of the ring $46^2$ and adapted to press against the edge of the ring 47 to force the same firmly against the plane surface of the carrying ring 43. There are a number of these springs arranged at short intervals around the full circumference of the packing rings. The oscillating socket ring 52 corresponds to the ring 32 of Fig. 1 but instead of being forced against the ball ring $46^2$ by a single spiral spring encircling the rod 4 this ring 52 is held firmly in place by a number of longitudinally arranged coiled springs 53 adapted to press against the face 54 of the inner gland. It will thus be seen that a packing substantially the same as that of Fig. 1 is formed on the rod.

In large engines where it is impracticable to slip the packing rings and glands over the ends of the rods it is necessary to divide the glands in order to make them readily attachable or removable on the rod. At the same time it will be seen that steam tight joints must be preserved between the several parts. The packing rings in such a case may be made as indicated in either Fig. 6, 7, or 8. In Fig. 6 the ring is divided into two parts having a lap-joint and secured together by the bolt 60. In Fig. 7 straight cuts are made in the two rings 61 and 62 which take the place of the single ring shown in Fig. 6 and the parts are secured together by the bolt 63. In Fig. 8 adjoining ends of the ring segments are connected by the strap 64 bolted thereto by the bolts 65 preferably counter-sunk in the rings. In manufacture the cylindrical rings are first turned up to the proper dimensions and jointed and placed together. The ball or socket surfaces are then turned up and the parts marked. After which the rings may be disassembled or completed as desired. The gland 40 is made as shown in Fig. 5. The bottom of the gland is U-shaped and the top 66 slips down into the same. The two parts are then secured together. I preferably provide the key 68 dove-tailed into the upper surfaces of the two parts of the gland and fastened in place by the split pin 69. Both of the glands are secured on the cylinder head by the long bolts or studs 70 passing through both into the cylinder head as shown. By loosening the burrs 71 on the stud the gland sections may be removed, also the metallic packing if necessary.

It is sometimes more convenient to employ the construction shown in Fig. 9 where the inner gland is bored out large enough to receive all of the packing. The outer gland being only large enough to provide the surface 75 corresponding to 13 of Fig. 1. The studs 70 (Fig. 9) are preferably made long as shown so that considerable flexible packing could be inserted back of the washer 35 if desired.

In Fig. 9 I have shown a fourth packing ring 80 of a rectangular cross section and adapted to press up against the rings 47 and 45. This ring is split two or three times as necessary according to the diameter of the rod and is held firmly about the rod by the continuous coiled spring 81 provided in the annular groove of the ring. The groove is provided with a narrow extension adapted to receive a binding wire 82 which will prevent the falling away of the rings from the rod. This is however prevented by the overlapping part 83 of the ball ring $46^2$. The device of Fig. 9 is further modified by the entire removal of the oscillating socket ring, the end of the coiled spring 7 being adapted to bear directly on the ball surface of the ring $46^2$ as shown. This latter construction is more particularly designed to small engines.

In practice the area of the packing rings is calculated so that the steam pressure upon them will equal or just over-balance the tension of the following springs.

Having thus described my invention I claim as new, and desire to secure by Letters Patent:—

1. The combination in a rod packing, of packing rings with a ball ring engaging the same, said packing rings and said ball ring forming a plane joint at right angles to the axis of the rod whereby lateral movement of said packing ring is permitted independently of said ball ring, and means for exerting an equal pressure upon all points of said ball ring, substantially as described.

2. The combination in a rod packing, of the packing ring or rings, retaining rings for holding said packing rings in place said packing rings and said retaining ring forming a plane joint at right angles to the axis of the rod whereby lateral movement of said packing rings is permitted independently of said retaining ring, a follower engaging said retaining ring and forming a ball joint therewith, and a series of springs engaging said follower, as and for the purpose specified.

3. The combination with the rod, of the packing rings adapted to engage the same with a ball ring arranged on the rod and engaging said packing ring and through which force may be exerted on said packing rings, a plane joint being formed between said packing ring and said ball ring at right angles to the axis of the rod whereby said packing ring may move laterally with the rod independently of said ball ring, and a series of spiral springs arranged around the said rod and adapted to exert a pressure upon the ball surface of said ring, substantially as described.

4. The combination with the rod, of packing rings arranged thereon, a follower ring to engage the same, a plane joint being formed between said packing rings and said follower ring at right angles to the axis of the rod and an oscillating ring provided with a series of springs and arranged to engage said following ring, a ball joint being provided between said oscillating and follower rings, and said oscillating ring having a center opening of greater diameter than the rod whereby said ring is made laterally movable with respect to the same, substantially as described.

5. The combination with a cylinder head, of a gland and rod adapted to pass through the same, packing rings arranged thereon, a retaining ball ring on each side of said packing rings, plane joints being formed between said ball rings and said packing rings at right angles to the axis of the rod, socket rings of a greater diameter than said rod and adapted to engage said ball rings, and to oscillate with respect to the rod, means for pressing the rear socket ring upon a ball ring and a socket ring arranged between the forward ball ring and a ground or plane surface on said gland, as described.

6. The combination with the rod, of a packing ring 47, and narrower rings arranged between the same and the rod, retaining rings to engage the sides thereof, and springs 51 arranged in one of said retaining rings and adapted to press said ring 47 against a ground surface on the outer ring, substantially as described.

7. The combination with a split packing ring 47, smaller split packing rings arranged between the same and the rod, a spring device passing around the said ring 47, and adapted to compress the same with an equal tension at all points, and retaining rings 43 and $46^2$ provided with flanges or ribs 44 and 45, substantially as described.

8. The combination with the rod, of a stuffing box and removable gland, a plane surface provided upon the annular inner end of said gland, packing rings arranged about said rod, ball rings 43 and $46^2$ provided with ribs or flanges, the gland and ring 14 and the oscillating ring to engage the retaining ring $46^2$, ball joints between the same, and depending retaining rings, and means for pressing said oscillating ring forward, the inner shoulders of said rings 43 and 46 being substantially perpendicular to the rod, as described.

9. The combination with the cylinder head having a stuffing box, the rod passing through the same, an inner gland, a washer 35 adapted to closely embrace the rod and loosely secured on the end of said inner gland and outer gland, and a metallic packing arranged between said glands and on said rod, substantially as described.

10. The combination with the cylinder head, of the rod, said head provided with a stuffing box, an inner gland arrranged therein, an outer gland arranged thereon, openings through the same and through the rear end of the stuffing box the same being larger than the rods and adapted to admit free lateral movement of the rod, and a packing composed wholly of metal and arranged between said glands, substantially as described.

11. The combination with the cylinder head, having the stuffing box, of the rod, an inner gland arranged in said stuffing box, a washer 35 secured thereon by bolts 37, counter-sunk openings for the heads of said bolts, and holes 38 to admit said bolts and larger than the same, an outer gland, metallic packing arranged between said glands, and stud bolts by means of which both of said glands are secured, said stud bolts being of a length sufficient to admit ordinary packing being placed between the washer 35 and the inner end of the stuffing box, substantially as described.

12. The combination with the gland 40, of the removable section 66 thereof, the bolts 67, and the locking key 68, as described.

In testimony whereof I have hereunto set my hand this 18th day of July, 1891.

FERRIS D. TOUCEY.

In presence of—
A. C. PAUL,
FRED S. LYONS.